Jan. 18, 1938. J. KNUDSON 2,105,740
AUTOMOBILE COLLAPSIBLE BERTH
Filed Nov. 27, 1935 3 Sheets-Sheet 1
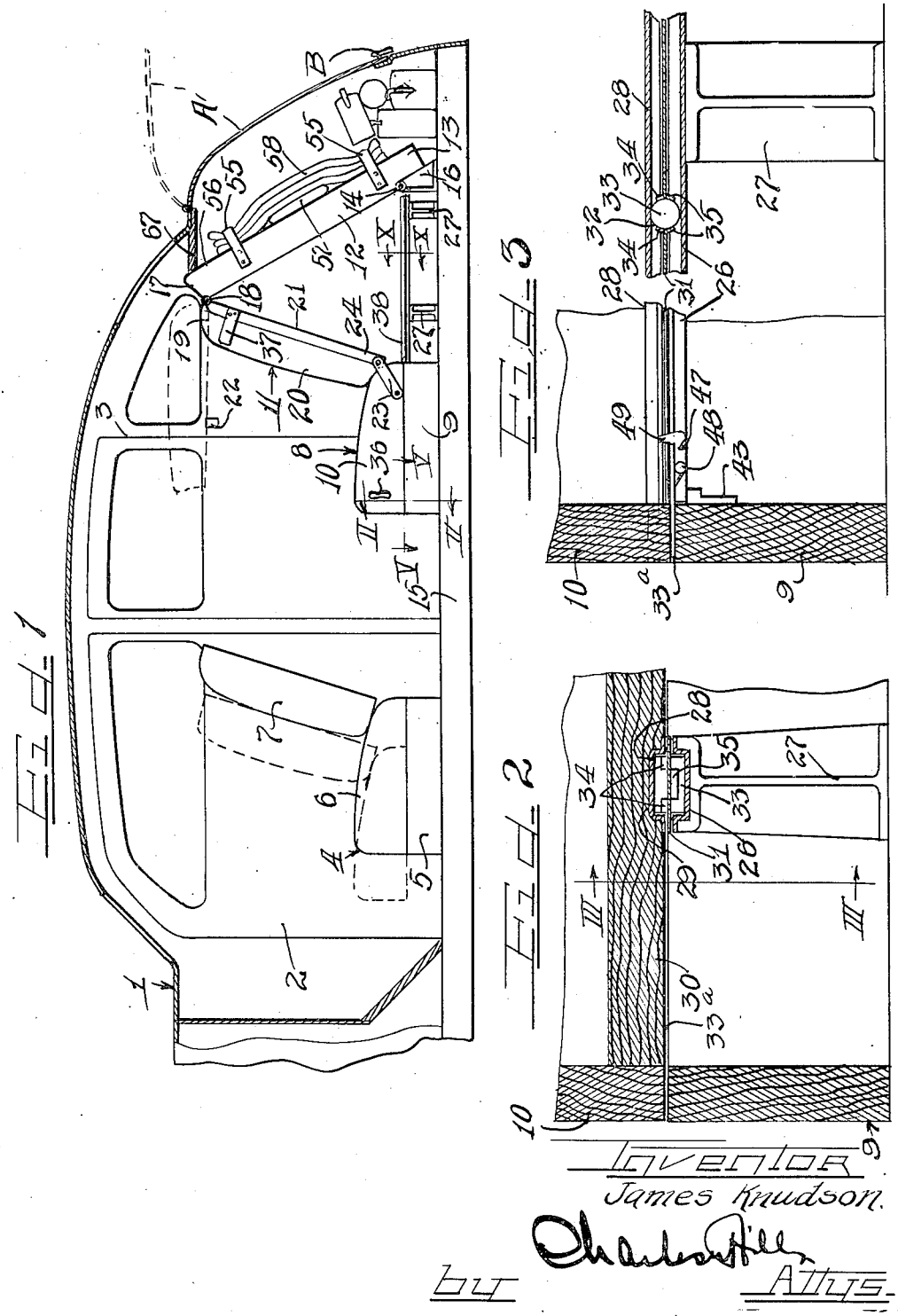

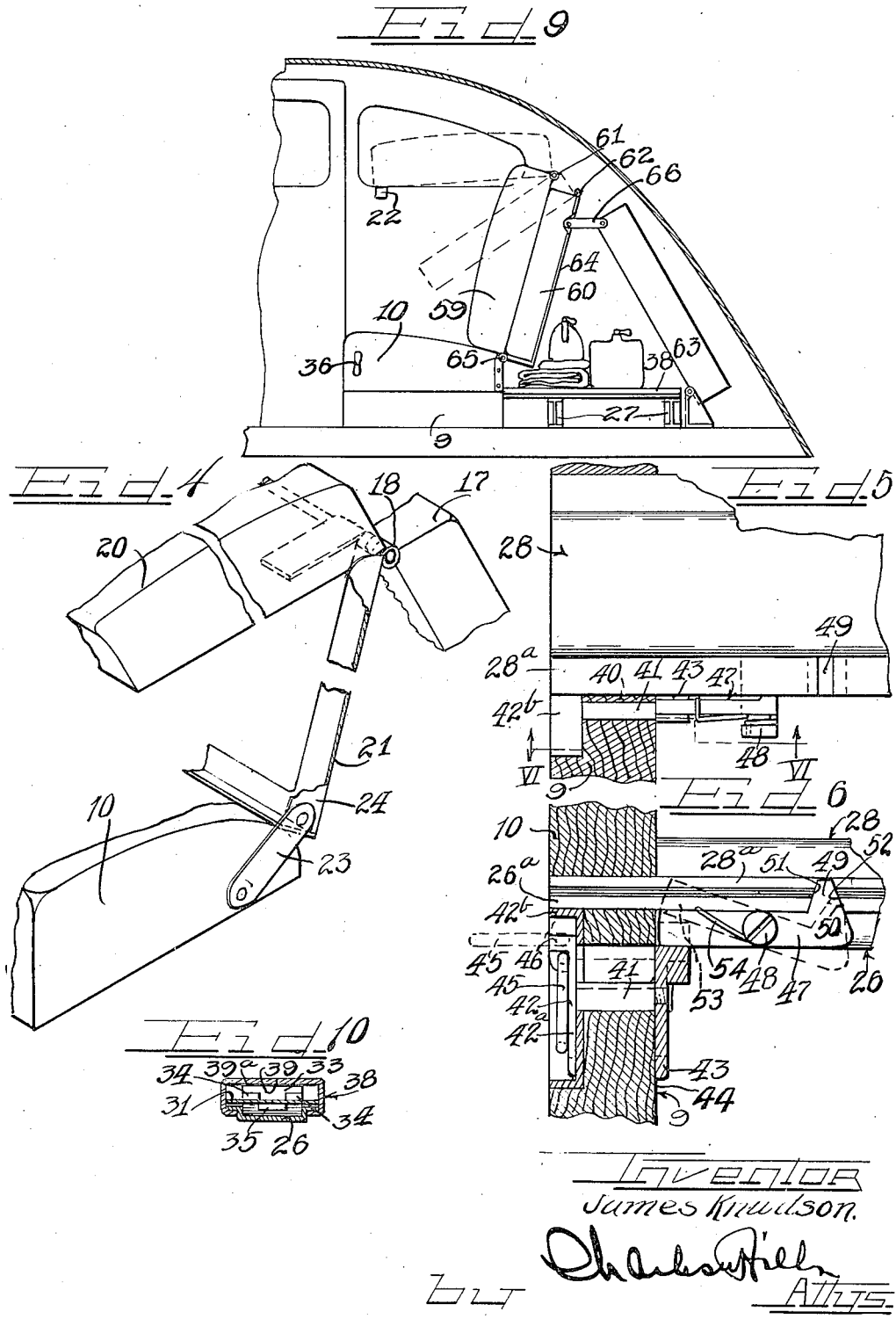

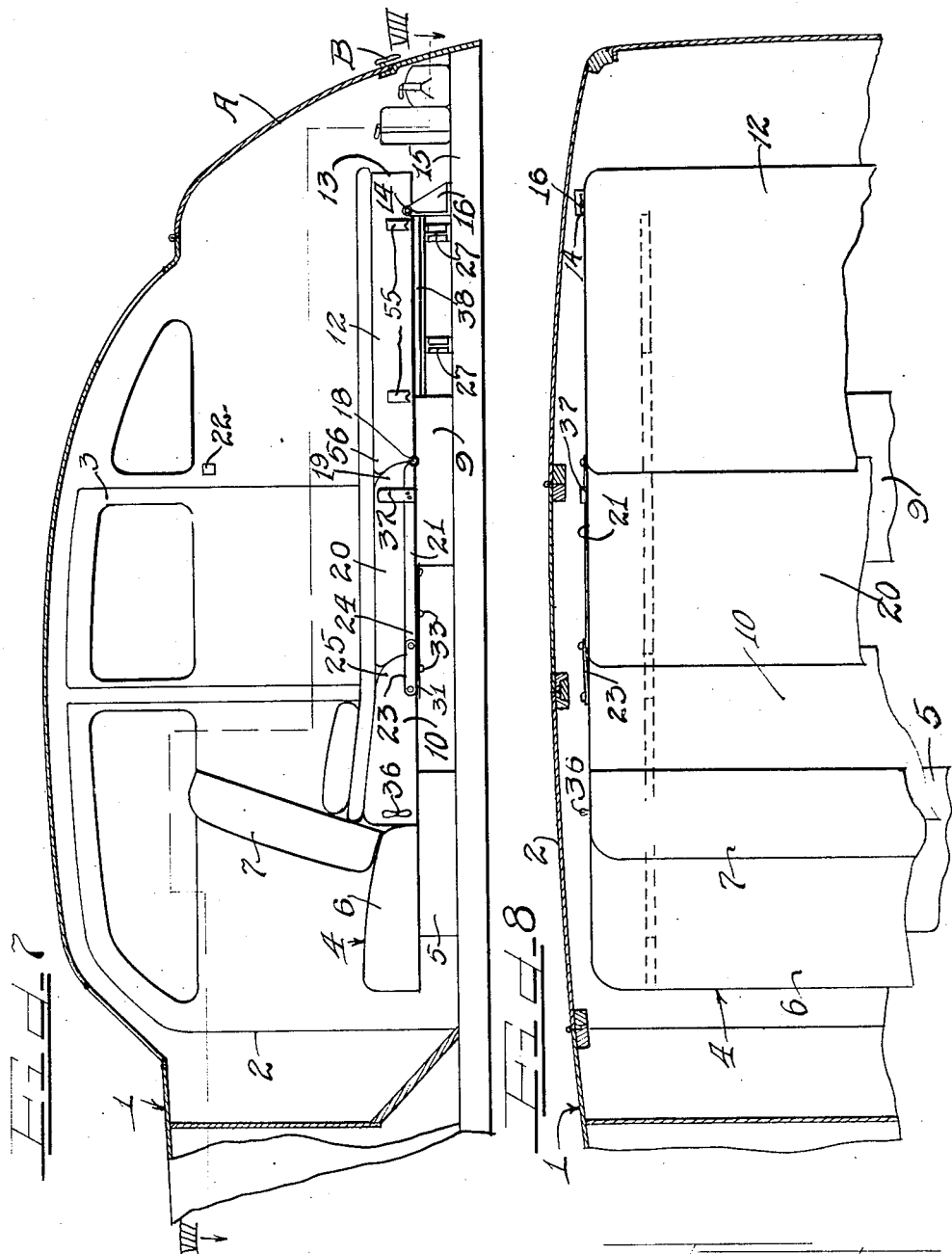

Patented Jan. 18, 1938

2,105,740

UNITED STATES PATENT OFFICE 2,105,740

AUTOMOBILE COLLAPSIBLE BERTH

James Knudson, Chicago, Ill.

Application November 27, 1935, Serial No. 51,728

7 Claims. (Cl. 155—7)

This invention relates to motor vehicles and is concerned more particularly with the provision of such a vehicle with sleeping accommodations.

It is an object of the invention to provide an automobile with means affording comfort to a person while reclining in an ordinary two seat car, without interfering with the driving of the car.

It is another object of the invention to combine with the back seat, means normally out of sight and yet capable of use in conjunction with said seat to provide a temporary mattress for affording a comfortable berth for one or more persons regardless of whether the vehicle is being driven or at rest.

A further object of the invention involves the provision of a knockdown bed construction for an automobile wherein the major portion of the bed structure is formed from the usual seat structure provided at the back of the vehicle.

It is also an object of the invention to provide a collapsible back seat structure with means by which the same may be readily knocked down to provide a temporary berth and also readily readjusted to serve its normal function of supporting one or more persons in seated position.

A further object of the invention involves the provision of track means substantially out of sight and yet enabling the back seat to be readily shifted forwardly and rearwardly to a position where it forms part of a temporary bed and to a position where it assumes its normal seat function.

It is a further object of the invention to make use of the additional space provided when the front seat is adjusted forward to receive the forward part of the back seat when the back seat is articulated to provide a temporary bed.

It is also an object of the invention to provide a temporary bed construction of such character that it requires a minimum of parts and may be incorporated in any car having sufficient room behind the driver's seat to accommodate comfortably a person in a prone position.

The invention also contemplates the provision of substantial room between parts of the bed structure and behind the same for the reception of luggage which may be rendered available without inconvenience.

In accordance with the general features of the invention, the back rest and seat rest of the back seat are hinged together, and an auxiliary cushion extension is hinged to the upper end of the back rest, forming an articulated series, the lower end of the auxiliary section being stationarily hinged to the body adjacent the floor in or near the rear baggage compartment. By releasing a suitable catch and then pulling forwardly on the back seat rest, or by manipulating the back rest or the auxiliary section, the series may be readily articulated into a substantially horizontal plane, the seat rest support or base remaining stationary and serving as a support for the juncture of the back rest and auxiliary section, and the forward end of the rear seat rest being supported on the support or base of the front seat. Suitable provision is made in connection with the auxiliary section for securing a pillow, blankets and the like in a position where the same are concealed when the rear seat is in use as such. When the sections are in a generally horizontal plane, they are suitably supported to prevent accidental buckling and, to this end, the weight of the person will substantially contribute. Luggage may be positioned in the space between the rear of the vehicle body and the rear section when the same is in inoperative position, and the space between said section and the rear seat back rest may be similarly utilized. The back rest comprises a part capable of being swung to a position rendering the luggage immediately therebehind readily accessible, preferably without breaking the hinged joint between the back rest and the seat rest. If desired, the back rest may comprise separable sections, both of which may be raised to afford access to luggage therebehind, and the outer of which remains elevated when the structure is employed as a bed.

The seat rest at the rear of the car is noiselessly movable along a track structure which is substantially completely concealed at all times and provision is made to retain the rear seat in its seating position when desired.

Further objects and advantages of the invention will appear as the description proceeds.

The invention (in preferred forms, is illustrated in the drawings and hereinafter more fully described.

Figure 1 is a longitudinal view of a part of a vehicle back of the engine, partly in section and partly in elevation, showing one form of the invention.

Figure 2 is an enlarged fragmentary sectional view taken substantially in the plane designated by the line II—II in Figure 1, showing the track structure.

Figure 3 is a broken sectional view taken substantially as indicated by the line III—III in Figure 2, certain parts being shown in section and others in elevation to bring out details more clearly.

Figure 4 is an enlarged fragmentary view in perspective, showing portions of the three sections at the rear of Figure 1, with the intermediate section raised from its supporting frame.

Figure 5 is an enlarged fragmentary sectional view, partly in section and partly in elevation, taken substantially as indicated by the line V—V in Figure 1.

Figure 6 is a fragmentary view partly in section and partly in elevation, taken substantially as indicated by the line VI—VI in Figure 5.

Figure 7 is a view similar to Figure 1 but shows the various parts relatively adjusted to provide a temporary berth.

Figure 8 is a fragmentary plan view of the structure appearing in Figure 7, portions of the vehicle body structure being shown in section and the remainder in elevation.

Figure 9 is a view similar to Figure 1 but showing a modified form of the invention.

Figure 10 is a sectional view taken substantially in the plane indicated by the line X—X in Figure 1.

Referring now more particularly to the drawings, the automobile type chosen for illustrating one form of the invention is shown at 1 to comprise front and rear side doors 2 and 3, a front seat 4 comprising a stationary base 5, seat rest 6 and back rest 7 movable with the seat rest, and a rear seat 8 comprising a stationary support or base 9, a relatively movable seat rest 10 and a back rest 11. In many cars, provision is made for adjustment of the front seat structure 4 as a unit on the base 5. The front seat structure appearing in Figure 1 is shown with the parts 6 and 7 rearward of the foremost position they are capable of occupying. By means of any suitable adjusting mechanism, these parts may be shifted forwardly to accommodate a driver having relatively short limbs, the forward part of the seat rest 5 overhanging the base 4, and the rear part of the base 4 thereupon providing a relatively rearwardly disposed ledge, as clearly seen in Figures 1 and 7.

In some cars now current, the back rest such as that shown at 11 is mounted only at its upper end and in such a manner as to be swingable upward to the position shown in dotted lines in Figure 1, in order to render the space therebehind readily accessible for luggage. This rest on such cars is mounted on structure which is relatively rigidly connected to the body. In accordance with the present invention, the back rest 11 may be moved independently of the seat rest for the purpose of rendering luggage accessible, and is also movable in its entirety pivotally with the seat rest 10 as will hereinafter appear.

Instead of devoting the entire space at the rear of the back rest 11 to the storing of luggage, the present invention involves the provision of an auxiliary upholstered section 12 which, at its rear end 13, is hinged at 14 to a pair of brackets supported by the vehicle floor 15 as shown at 16. One such bracket 16 is illustrated in Figure 1. The other end portion 17 of the section 12 is hinged at 18 to the upper end portion 19 of the rear seat back rest 11.

The back rest 11 comprises an upholstered section 20 and a substantially angular side and forward end frame construction 21, independently hinged at 18 to the rear section 12. With this structure, it is evident that the upholstered section 20 may be raised from the frame 21 to afford a large opening through which access may be had to the compartment directly to the rear of the frame, for the disposition and removal of luggage. When the rear seat is performing its function as such, as shown in Figure 1, the section 20 will fit snugly against the seat rest 10 and the adjacent side walls of the body, and will remain within the frame 21 although a catch may be provided, if desired, to detachably hold the section 20 in place. When the section 20 is swung to elevated position as shown by dotted lines in Figure 1, it may be held as by a spring catch 22 which may be duplicated at each side. This catch may be of a character which is shoved aside as the section 20 is raised and thereafter springs out to abut the underside of the section 20. Any other suitable catch or latch may be provided for this purpose. When it is desired to allow the section 20 to descend, the catch 22 may be merely pressed toward the wall on which the same is mounted, to a position where it does not interfere with the descent of the section 21.

A link 23 pivotally connects the forward end 24 of the frame 21 with the rear end portion 25 of the seat rest 10. Thus the upholstered sections 10, 20 and 12 are connected in series by hinges to provide an articulated construction. The sections 10 and 20 are preferably of the same size to be found in the rear seat structure of the automobile, and the section 12 is made of sufficient dimensions, longitudinally of the car, to afford, in combination with the sections 10 and 20, a length which may be conveniently made in excess of six feet, affording sufficient room for enabling one or more persons to lie on the temporary bed so formed in complete comfort.

The trackage providing for the forward and rearward adjustment of the seat rest 10 to enable the sections to assume positions in substantially the same horizontal plane or to enable them to be reassembled into the relative positions shown in Figure 1 will now be described.

To this end, there is provided adjacent each side of and within the rear part of the vehicle a generally channel shaped bar 26 mounted on and held by the base 9 and brackets 27 spaced longitudinally of the car. A similar channel member 28 is mounted in a recess 29 in the framework 30 of the seat rest 10. The channel members 26 and 28 open toward each other and are arranged one above the other as shown in Figure 2.

A roller bearing structure is interposed between the channels 26 and 28. This structure, for each cooperating pair of channel members 26 and 28, comprises a plate 31 extending longitudinally between the channel members and is adapted to float. To this end, the plate 31 is provided with a longitudinal series of transversely extending openings 32, in each of which a roller bearing 33 is received. The diameter of the rollers 33 is such that when such rollers are in contact with the webs of the channel members 26 and 28, the flanges of said members are spaced apart and in addition the plate 31 is spaced from the flanges of both of said members, as shown in Figures 2 and 3. At the sides of each roller opening, portions are struck up as at 34 and others down as at 35 and formed to embrace opposite arcuate portions of the intervening roller 33 so as to slidably retain the roller in place and so as to support the plate 31 in a plane extending horizontally through a diameter of the roller. Suitable clearance 33a is preferably provided between the base 9 and seat rest 10 so that the relative movement of the parts may be effected without interference. When the rear seat 8 is employed as such, it will be seen from Figure 1 that the track structure is substantially concealed from view and does not interfere with the seat in any way.

To facilitate movement of the rear seat rest 10, a handle 36 may be provided inconspicuously at one or both sides of the seat. It will be noted that when the seat 10 is at its rearmost position as shown in Figure 1, the handle is located adjacent the rear door 3 so that the latter may be opened, affording space in which a person may stand as he wields the handle, shoving or pulling the same toward the front of the car. This forward movement of the seat 10 and the adjacent sections 20 and 12 may be effected with merely a slight amount of effort, since substantially the only resistance necessary to be overcome is the friction due to the weight of the seat 10 on the rollers 33. The effort required is lessened due to the tendency of the sections 20 and 12 to gravitate to horizontal positions in line with the seat 10. Moreover, when the temporary bed is formed as shown in Figure 7, the handle 36 is adjacent the opening served by the front door 2 so that when it is desired to collapse the bed into the form of the seat at the rear of the car, the front door may be opened to render the handle 36 readily accessible.

To collapse the bed to employ the section 10 as a seat, the frame 21 adjacent the pivot 18 may be provided with a strap 37 at one or both sides. This strap may be conveniently located for ready access when the rear door is opened, and the dead center between middle section frame 21 and the rear section 12 may be broken with little effort upon an upward pull on the strap or straps 37, preferably coincident with a rear pull or thrust on the handle 36.

The roller bearing plate 31 extends preferably between the forward end of the base 9 and the bracket 16. Obviously, the seat 10 will move twice as far, relative to the base 9, as the roller plate 31. As the seat 10 is moved forwardly from the base 9, the plate 31 is also extended forwardly so as to be supported in substantially cantilever fashion by the overlapping portions of the base 9 and seat 10. When the seat 10 is clear of the base 9, the free forwardly extending part of the plate 31 and its rollers will support the seat 10, said plate and rollers being retained in a substantially horizontal plane by the base 9 and a retainer 38 preferably secured to the lower channel member 26 rearwardly of the forward end of the base 9. Any suitable retaining means may be employed, that herein illustrated comprising a channel strip inverted with respect to the channel member 26 and secured marginally thereto as shown in Figure 10 to present a web 39 disposed above and normally in spaced relation to one or more rollers 33, as shown at 39a. The length of the retainer strip 38 is preferably such in relation to the spacing of the rollers that at least one roller will be disposed under the web thereof at all times. In the forward movement of the seat 10, when it clears the base 9, the tendency for the front end of the strip 31 to dip will result in a slight raising of the rear part of the plate 31 and its rollers. Some one or more of these rollers will engage the web 39 of the retainer strip 38 and roll therealong. Upon return movement of the seat 10, the rollers 33 will roll along the retainer strip web 39 until the seat 10 is located over the base 9. At this point, the plate 31 will no longer dip as the seat 10 continues in its rearward movement, the bar 28 engaging the rollers.

It will be noted from Figure 2 that the channel members 26 and 28 are spaced from the lateral walls of the base 9. The sections 20 and 12 may be recessed in substantial alignment with the recesses 29 in the seat 10 in order to accommodate the upper portions of the rollers 33 and the retainer strip 38 so that said rolls and strip will not interfere with the horizontal positioning of the sections 20 and 12.

Substantially all cars provide for adjustment of the front seat, and this provision may take the form of the track structure already described in connection with the rear seat, or any other form. In such structures now current, provision is made for adjustment and retaining the front seat at the desired position forwardly or rearwardly. With the track structure above described, suitable retaining means illustrated in detail in Figures 5 and 6 may be provided. To this end, there is provided at the front of the base 9 a substantially vertical slot 40 which slidably receives a retainer slide element 41. Guides 42 and 43 secured to the ends of the element 41 slidably engage respectively the wall 42a of the inset bracket 42b and the wall 44 of a frame member forming the front end of the base 9. The upper part of the front guide 42 is curled in the form of an eye and pivotally carries an actuating ring or other handle member 45. Adjacent the eye is an abutment 46 which limits the swing of the member 45 to a substantially horizontal position from which it may be pulled conveniently to raise the slide 41. The handle 45 is normally held by gravity out of the way. The slot 40 and slide 41 are carried adjacent the channel member 26 in the base 9.

A lever 47 is pivotally carried at 48 by the channel member 26 and carries a lug 49 at its rear part. The adjacent channel lip 26a of the channel 26 is provided with a notch 50 to receive said lug 49. The roller plate 31 and upper channel lip 28a are provided with corresponding notches 51 and 52, respectively, which are adapted to register with the notch 50 when the seat 10 is in its rearmost position as shown in Figures 1 and 6.

The forward part of the front end 53 of the lever 47 is arranged in the path of movement of the rear guide 43 of the slide 41. It is therefore evident that when it is desired to withdraw the lever lug 49 from the notches 51 and 52, it is necessary merely to grasp the actuating element 45, raise it to a substantially horizontal position as shown in dotted lines in Figure 6, and then raise the slide 41 bodily, the inner guide 43 thereupon raising the forward end 53 of the lever 47 and correspondingly withdrawing the lug 49 from the notches 51 and 52. This action frees the seat 10 for forward movement. It is not necessary to continue holding the slide 41 in its elevated position after the movement of the seat 10 forward has commenced, since then the upper end of the lug 49 will simply ride against the under side of the plate 31. When the seat 10 is thereafter returned to the position shown in Figure 6, the spring 54 will automatically snap the lug 49 into the notches 51 and 52, thereby holding the seat 10 against accidental movement.

If desired, suitable means such as that described, or any other means, may be provided for preventing rearward movement of the seat 10 after the bed sections are arranged in a substantially horizontal plane. However, it will not be necessary to provide such additional retaining means, inasmuch as the abutment of the adjacent ends of the sections while such sections are in a substantially horizontal plane, and the connection between the brackets 16 and the rear end 13 of the rear section 12 will suffice to prevent collapse of the bed formed by the horizontally extending sections.

It will be observed that ample space is provided between the central section 20 and rear section 12 for the storage of luggage, and such space is likewise in evidence from Figure 1 at the rear of the rear section 12. The rear section 12 may be conveniently provided with straps 55 arranged to extend over the upper side 56 thereof for securing one or more pillows 57, blankets 38 and for other desired material. When the temporary bed is made, such material is readily accessible to be unstrapped and put to use.

Figure 7 shows a temporary or converted bed ready for use. A suitable blanket or bolster may be carried along to cover the extended sections to obviate any unevenness and thereby add comfort to the reclining person.

It will be appreciated that in the case of an automobile providing sufficient room for the accommodation of the convertible bed in extended position, shifting forward of the front seat 4 need not necessarily be required.

In Figure 9 is shown a modification, wherein the back rest structure of the rear seat comprises two parts 59 and 60, independently pivotally supported at their upper ends 61 and 62 respectively, the front part 59 being adapted to be supported in an elevated position as shown in dotted lines while the section 60 serves as the middle section of a temporary bed comprising also the seat rest 10 and the rear section 63. The rear central section 60 is preferably carried in a frame 64 whose forward end is pivotally connected at 65 to the upper rear end of the section 10. As indicated in dotted lines, the section 60 may be raised from the frame 64 to render the space between the frame 64 and the rear section 63 accessible for luggage.

The upper or rear part of the frame 64 is linked at 66 to the forward end of the rear section 63. Any suitable means such as that shown in detail in Figures 5 and 6 may be employed for holding the seat 10 stationary when desired. When the seat 10 is held stationary, the sections 60 and 63 are held by suitable retaining means in stable equilibrium, and the section 59 may be swung down into engagement with the section 60 and be snugly held by the seat 10 and the body walls.

In this form of the invention, the back part 60 may be formed substantially flat on its upper or front side, and be substantially flush with the upper side of the rear section 63 when the bed is made. Thus the front part 59 may be upholstered in the usual manner with a front curvature for comfort to the back of the person, and yet the rear part 60 may be employed as a part of the bed itself, the connected adjacent ends of the parts 60 and 63 under such circumstances being in substantially abutting engagement, and the adjacent ends of the frame 64 and seat rest 10 being likewise in substantial inter-engagement.

An abutment 67 providing a shelf may serve to limit back swing of the rear sections 12 and 63.

The back door A may be provided with a locking handle B, and when this door is open, berth paraphernalia may be readily secured to the rear section 12. The screw or lever type manipulating means just described could be arranged in conjunction with the back section 12 or 63, so as to be asily accessible when the door A is open.

The part 60 and section 63 are suitably grooved so as not to interfere with the retaining strip 38 and rollers 33 as described in connection with the first form of the invention.

In the absence of such manipulating means, the hand or hands may be placed against the back section 12 or 63 and shoved forwardly when it is desired to extend the sections to form the berth.

It will be seen from the foregoing that the present invention provides means whereby a conventional rear seat may be provided whenever desired and, with slight effort and relatively slight structural additions, a comfortable bed may be formed, employing all or at least a substantial part of the rear seat for this purpose. Such a bed assembly may conveniently accommodate one or more persons, and is so arranged that its occupancy need not interfere with the driving of the car.

I claim as my invention:

1. In an automobile body, an articulated rear seat assembly including a plurality of angularly arranged sections hingedly connected in series, and means slidably supporting one of said sections in the body whereby said sections may be disposed by a forward movement into a horizontally aligned position to form a bed, said sections including a rear section normally concealed in the rear of the body hinged at an upper portion to an adjoining section of said assembly and extending rearwardly downwardly therefrom behind said adjoining section, said rear section when concealed being supported in an inclined position with its lower end rearmost and pivotally fastened to the automobile body so as to define a storage space between it and said adjoining section.

2. In an automobile body construction having a rear seat which is adapted to be extended into a berth, the combination comprising a rear seat rest mounted for sliding movement in a horizontal plane, a back rest including open frame and cushion parts extending upwardly and rearwardly from the back portion of said seat rest, said frame part being jointed to said seat rest and said cushion part being pivotally mounted on the upper part of said frame, whereby said cushion may be swung clear of said frame at will, and a rear berth section jointed to the upper part of said frame and extending downwardly and rearwardly therefrom to form a brace member for said frame and to provide a space for luggage between said frame and said rear berth section, said luggage space being readily accessible from the interior of said automobile body upon swinging said cushion part upwardly about its pivot.

3. In an automobile body construction having a rear seat which is adapted to be extended into a berth, the combination comprising a rear seat rest mounted for sliding movement in a horizontal plane, a back rest extending upwardly and rearwardly from a point in proximity to the back portion of said seat rest and pivotally mounted at its top on said body, an intermediate berth section disposed behind said back rest and jointed to said seat rest, said intermediate berth section being adapted to brace and partially support said back rest, and a rear berth section jointed to the top of said intermediate section and extending downwardly therefrom between said intermediate section and the rear wall of said body.

4. In an automobile body construction having a rear seat which is adapted to be extended into a berth, the combination comprising a rear seat rest mounted for sliding movement in a horizontal plane, a back rest extending upwardly and rearwardly from a point in proximity to the back portion of said seat rest and pivotally mounted at its top on said body, an intermediate berth section including open frame and cushion parts disposed behind said back rest, said frame part being jointed to said seat rest and said cushion part being pivotally mounted on the upper part of said frame, whereby said cushion may be swung clear of said frame at will, and a rear berth section jointed to the upper part of said frame part and extending downwardly therefrom between said intermediate section and the rear wall of said body.

5. In an automobile body construction having a rear seat which is adapted to be extended into a berth, the combination comprising a rear seat rest mounted for sliding movement in a horizontal plane, a back rest extending upwardly and rearwardly from a point in proximity to the back portion of said seat rest and pivotally mounted at its top on said body, an intermediate berth section including open frame and cushion parts disposed behind said back rest, said frame part being jointed to said seat rest and said cushion part being pivotally mounted on the upper part of said frame, whereby said cushion may be swung clear of said frame at will, and a rear berth section jointed to the upper part of said frame part and extending downwardly and rearwardly therefrom to form a luggage space between said intermediate and rear berth sections, said luggage space being readily accessible from the interior of said automobile body upon swinging said back rest and said cushion upwardly on their respective pivots.

6. In an automobile body construction having a rear seat which is adapted to be extended into a berth, the combination comprising a rear seat rest, a back rest, a normally concealed berth section normally extending at a substantial angle to the horizontal to minimize encroachment of luggage space, said seat rest, back rest, and berth section being angularly arranged and hingedly connected so as to be extended into a berth position at will, a rear door in said body, and means accessible through said door for detachably securing berth paraphernalia to said section, said berth section when concealed being supported in an inclined position with its lower end rearmost and pivotally fastened to said body so as to define a storage space between said section and said back rest.

7. In an automobile body construction having a rear seat which is adapted to be extended into a berth, the combination comprising a rear seat rest mounted for sliding movement in horizontal plane, a back rest, a normally concealed berth section normally extending at a substantial angle to the horizontal to minimize encroachment of luggage space, said seat rest, back rest, and berth section being articulated together and adapted to be extended into a berth position at will, said berth section when concealed being supported in an inclined position with its lower end rearmost and pivotally fastened to said body so as to define a storage space between said section and said back rest, a rear door in said body, and means accessible through said door for detachably securing berth paraphernalia to said section on a side thereof which will be uppermost when said section is disposed in its berth defining position.

JAMES KNUDSON.